United States Patent
Jeanne et al.

(10) Patent No.: US 12,533,107 B2
(45) Date of Patent: Jan. 27, 2026

(54) ULTRASOUND IMAGING DEVICE

(71) Applicant: MODULEUS, Tours (FR)

(72) Inventors: Edgard Jeanne, Tours (FR); Lucie Ordronneau, Tours (FR)

(73) Assignee: MODULEUS, Tours (FR)

( * ) Notice: Subject to any disclaimer, the term of this patent is extended or adjusted under 35 U.S.C. 154(b) by 0 days.

(21) Appl. No.: 18/717,913

(22) PCT Filed: Dec. 7, 2022

(86) PCT No.: PCT/EP2022/084704
§ 371 (c)(1),
(2) Date: Jun. 7, 2024

(87) PCT Pub. No.: WO2023/117416
PCT Pub. Date: Jun. 29, 2023

(65) Prior Publication Data
US 2024/0407756 A1    Dec. 12, 2024

(30) Foreign Application Priority Data
Dec. 21, 2021  (FR) ..................... 21/14110

(51) Int. Cl.
*A61B 8/00* (2006.01)
(52) U.S. Cl.
CPC .............. *A61B 8/4281* (2013.01); *A61B 8/48* (2013.01); *A61B 8/546* (2013.01); *A61B 8/56* (2013.01)
(58) Field of Classification Search
CPC ...... A61B 8/546; A61B 8/4272; A61B 8/4281
See application file for complete search history.

(56) References Cited

U.S. PATENT DOCUMENTS

| | | | | |
|---|---|---|---|---|
| 6,882,086 B2 * | 4/2005 | Kornbluh | .............. | F16F 15/005 310/330 |
| 2003/0060715 A1 | 3/2003 | Sato | | |
| 2003/0214199 A1 * | 11/2003 | Heim | ...................... | H04R 5/02 310/309 |
| 2004/0171970 A1 * | 9/2004 | Schleuniger | .............. | A61F 7/02 601/3 |

(Continued)

FOREIGN PATENT DOCUMENTS

| | | | | |
|---|---|---|---|---|
| EP | 2441492 A1 * | 4/2012 | ............... | A61N 7/02 |
| EP | 2992829 A1 | 3/2016 | | |

(Continued)

OTHER PUBLICATIONS

Office Action for EP Application No. 22823607.1 mailed Apr. 17, 2025. (machine translation).

(Continued)

*Primary Examiner* — Colin T. Sakamoto
(74) *Attorney, Agent, or Firm* — Perilla Knox & Hildebrandt LLP; Jason M. Perilla

(57) ABSTRACT

The present description concerns an ultrasound imaging device (100) comprising an assembly (101) of ultrasound transducers, and an acoustic coupling layer (140) coating said assembly (101) of ultrasound transducers, wherein the acoustic coupling layer (140) is made of an activatable polymer material configured to have a first Young's modulus during a phase of acquisition of an ultrasound image and a second Young's modulus greater than the first Young's modulus outside of said acquisition phase.

9 Claims, 3 Drawing Sheets

(56) References Cited

U.S. PATENT DOCUMENTS

| | | | |
|---|---|---|---|
| 2012/0219744 A1* | 8/2012 | Walker | A61L 29/126 264/320 |
| 2013/0072796 A1* | 3/2013 | Nakamura | A61B 8/4281 600/443 |
| 2017/0164926 A1* | 6/2017 | Spicci | A61N 7/00 |
| 2019/0200957 A1 | 7/2019 | Freiburg et al. | |
| 2019/0321007 A1 | 10/2019 | Hakkens et al. | |
| 2020/0121298 A1* | 4/2020 | Nakamura | A61B 8/56 |
| 2021/0124044 A1* | 4/2021 | Haque | A61B 8/08 |
| 2023/0079884 A1* | 3/2023 | Yamamoto | G01N 29/043 600/459 |

FOREIGN PATENT DOCUMENTS

| | | |
|---|---|---|
| FR | 2963430 A1 | 2/2012 |
| IT | 201800007696 A1 | 1/2020 |

OTHER PUBLICATIONS

International Search Report and Written Opinion for PCT/EP2022/084702 mailed Jun. 7, 2023.
International Search Report and Written Opinion for PCT/EP2022/084704 mailed Mar. 14, 2023.

* cited by examiner

ULTRASOUND IMAGING DEVICE

CROSS-REFERENCE TO RELATED APPLICATIONS

The present application is a 35 U.S.C. § 371 national stage patent application of Patent Cooperation Treaty application number PCT/EP2022/084704, filed Dec. 7, 2022, and entitled "ULTRASOUND IMAGING DEVICE," which claims the benefit of and priority to French patent application FR2114110, filed on Dec. 21, 2021, and entitled "Ultrasound Imaging Device", the entire contents of each of which are hereby incorporated herein by reference.

TECHNICAL FIELD

The present disclosure concerns the field of ultrasound imaging devices, and more particularly aims at skin print acquisition devices and/or microvascular imaging devices based on ultrasound transducers.

PRIOR ART

An ultrasound imaging device conventionally comprises a plurality of ultrasound transducers, and an electronic control circuit connected to the transducers. In operation, all the transducers are arranged in front of an object or body, an image of which is desired to be acquired. The electronic control circuit is configured to apply electric excitation signals to the transducers, to cause the emission of ultrasound waves by the transducers towards the body to be analyzed. The ultrasound waves emitted by the transducers are reflected by the body to be analyzed (by its internal and/or surface structure), then return towards the transducers, which convert them back into electric signals. These electric response signals are read by the electronic control circuit, and can be stored and analyzed to deduce therefrom information relative to the studied body.

It would be desirable to at least partly improve certain aspects of known ultrasound imaging devices.

SUMMARY OF THE INVENTION

For this purpose, an embodiment provides an ultrasound imaging device comprising an assembly of ultrasound transducers, an acoustic coupling layer coating said assembly of ultrasound transducers, and a heating device adapted to heating an object to be imaged arranged on the acoustic coupling layer during a phase of acquisition of an ultrasound image.

According to an embodiment, the device further comprises an electronic power supply and control circuit.

According to an embodiment, the heating device is adapted to collecting heat generated by the electronic power supply and control circuit and to dissipating all or part of this heat into the acoustic coupling layer, above the assembly of ultrasound transducers.

According to an embodiment, the heating device comprises one or a plurality of metal foils arranged to conduct the heat generated by the electronic power supply and control circuit and to dissipate all or part of this heat into the acoustic coupling layer, above the assembly of ultrasound transducers.

According to an embodiment, the heating device further comprises one or a plurality of switches configured to interrupt the heat transfer towards the acoustic coupling layer if an inner temperature of the device exceeds a predetermined threshold.

According to an embodiment, the heating device comprises a flexible Peltier module, having a cold surface facing the electronic power supply and control circuit, and having a hot surface facing the object to be imaged.

According to an embodiment, the heating device comprises a heating mat comprising a serpentine metal resistor, arranged between the assembly of ultrasound transducers and the object to be imaged.

According to an embodiment, the heating mat is embedded in the acoustic coupling layer.

According to an embodiment, the heating mat covers the acoustic coupling layer.

According to an embodiment, the heating device comprises a heating layer made of a thermoelectric polymer material, integrated to the acoustic coupling layer.

According to an embodiment, the heating layer is electrically connected to the electronic power supply and control circuit by connection elements.

According to an embodiment, the ultrasound transducers of the assembly of ultrasound transducers are CMUT or PMUT transducers, piezoelectric or piezocomposite transducers, or single-crystal transducers.

According to an embodiment, the acoustic coupling layer comprises at least one layer made of an activatable polymer material configured to have a first Young's modulus during a phase of acquisition of an ultrasound image and a second Young's modulus greater than the first Young's modulus outside of said acquisition phase.

Another embodiment provides an ultrasound imaging device comprising an assembly of ultrasound transducers and an acoustic coupling layer coating said assembly of ultrasound transducers, wherein the acoustic coupling layer is made of an activatable polymer material configured to have a first Young's modulus during a phase of acquisition of an ultrasound image and a second Young's modulus greater than the first Young's modulus outside of said acquisition phase.

According to an embodiment, the acoustic coupling layer is made of a thermoactive, photoactive, electroactive polymer, or of a polymer that can be activated under the effect of a chemical or mechanical stimulus.

According to an embodiment, the acoustic coupling layer is made of a thermoactive polymer, the imaging device comprising a heating device configured to heat the acoustic coupling layer during a phase of acquisition of an ultrasound image, and to interrupt the heating outside of said acquisition phase.

According to an embodiment, the acoustic coupling layer is made of a thermoactive polymer that can be directly activated under the effect of the heat generated by an object to be imaged, for example a user's finger.

According to an embodiment, the acoustic coupling layer is made of a thermoactive polymer that can be activated to have the first Young's modulus when its temperature exceeds a threshold in the range from 25° C. to 40° C.

According to an embodiment, the acoustic coupling layer is made of a photoactive material having its Young's modulus taking the first value under the effect of a light irradiation at a first wavelength A, and recovering the second value under the effect of a light irradiation at a second wavelength B, different from A, or when the irradiation at the first wavelength A is interrupted, or under the effect of another stimulus.

According to an embodiment, the device comprises one or a plurality of first light sources adapted to emitting a radiation at wavelength A through the acoustic coupling layer, and one or a plurality of second light sources adapted to emitting a radiation at wavelength B through the acoustic coupling layer.

According to an embodiment, the device further comprises an electronic circuit for powering and controlling the assembly of ultrasound transducers, said one or a plurality of first and one or a plurality of second light sources being controlled by the electronic power supply and control circuit.

According to an embodiment, the acoustic coupling layer is made of an electroactive material having its Young's modulus taking the first value under the effect of an electric biasing, and recovering the second value in the absence of said electric biasing.

According to an embodiment, the device further comprises an electronic circuit for powering and controlling the assembly of ultrasound transducers, the device comprising first and second electrodes in contact with the acoustic coupling layer and connected to the electronic power supply and control circuit for the application of said electric biasing.

According to an embodiment, the ultrasound transducers of the assembly of ultrasound transducers are CMUT or PMUT transducers, piezoelectric or piezocomposite transducers, or single-crystal transducers.

According to an embodiment, the device is adapted to heating an object to be imaged arranged on the acoustic coupling layer during a phase of acquisition of an ultrasound image.

BRIEF DESCRIPTION OF THE DRAWINGS

The foregoing features and advantages, as well as others, will be described in detail in the rest of the disclosure of specific embodiments given as an illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail. In particular, the forming of the ultrasound transducers and of the electronic control circuits of the described devices has not been detailed, the described embodiments being compatible with the usual forming of these elements. Further, the various applications that the described devices can have have not been detailed, the described embodiments being compatible with all or most usual applications of ultrasound imaging devices, and in particular applications for imaging parts of the human or animal body.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front", "back", "top", "bottom", "left", "right", etc., or relative position qualifiers, such as "top", "bottom", "upper", "lower", etc., or orientation qualifiers, such as "horizontal", "vertical", etc., reference is made unless otherwise specified to the orientation of the drawings.

Unless specified otherwise, the expressions "about", "approximately", "substantially", and "in the order of" signify plus or minus 10%, preferably of plus or minus 5%.

Figure 1:
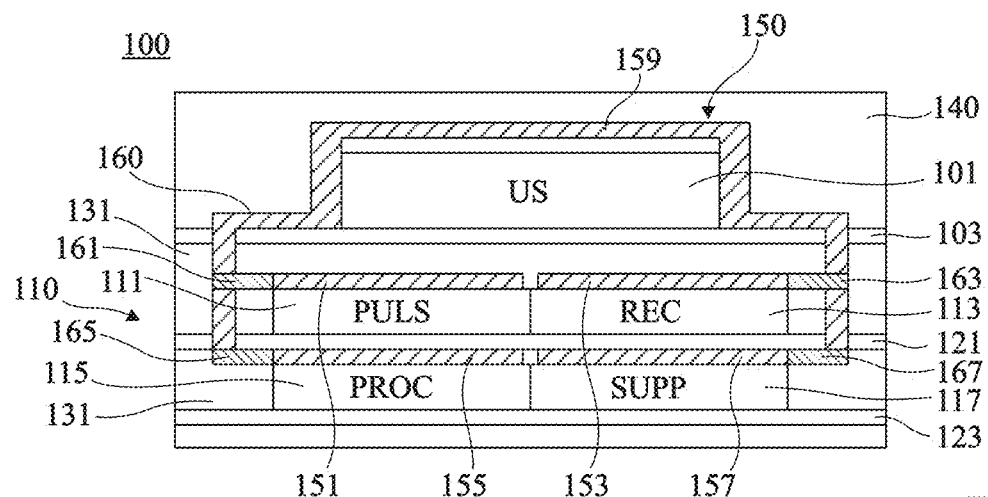
FIG. 1 schematically shows an example of an ultrasound imaging device according to an embodiment.

FIG. 1 is a cross-section view schematically showing an example of an ultrasound imaging device 100 according to an embodiment.

The device 100 of FIG. 1 comprises an assembly 101 of ultrasound transducers (US), for example arranged in an array, in a linear array, or according to any other arrangement. The transducers of assembly 101 are, for example, transducers of CMUT (capacitive membrane ultrasound transducers) type, transducers of PMUT (piezoelectric membrane transducers) type, crystal transducers, or any other type of ultrasound transducer, for example piezoelectric or piezocomposite transducers, or single crystal transducers.

The transducers of assembly 101 are, for example, integrated in a monolithic chip, for example formed inside and on top of a semiconductor substrate, for example a silicon substrate, or inside and on top of an insulating substrate, for example a glass substrate (not detailed in the drawing).

In the shown example, the assembly of transducers 101 is mounted on a printed circuit board 103. Printed circuit board 103 comprises, for example, a support made of an electrically-insulating material, for example made of plastic, and an assembly of metal interconnection areas and tracks (not detailed in the drawing) formed on at least one side of the support. In this example, the assembly 101 of ultrasound transducers is fixed and electrically connected to the upper surface of printed circuit board 103.

The device 100 of FIG. 1 further comprises an electronic power supply and control circuit 110.

Circuit 110 comprises a transmit circuit 111 (PULS) adapted to supplying electric excitation signals to the ultrasound transducers of assembly 101 to cause the emission of ultrasound waves by the transducers.

Circuit 110 further comprises a receive circuit 113 (REC) adapted to reading electric response signals generated by the ultrasound transducers of assembly 101 under the effect of an ultrasound wave received from the object to be imaged.

Circuit 110 further comprises a 115 circuit (PROC) for processing the electric signals transmitted by transmit circuit 111 and/or received by receive circuit 113.

Circuit 110 further comprises a power supply circuit 117 (SUPP). Circuit 117 is particularly adapted to electrically powering transmit circuit 111, receive circuit 113, and/or processing circuit 115.

Circuits 111, 113, 115, and 117 are, for example, integrated in one or a plurality of integrated circuit chips. As an example, circuits 111, 113, 115, and 117 are respectively integrated in four separate integrated circuit chips. The described embodiments are however not limited to this specific case.

Circuits 111, 113, 115, and 117 are, for example, mounted on one or a plurality of printed circuit boards. In the shown example, the emitter 111 and receiver 113 circuits are mounted on a printed circuit board 121, and the processing 115 and power supply 117 circuits are mounted on another printed circuit board 123. More specifically, in this example, the emitter 111 and receiver 113 circuits are fixed and electrically connected to the upper surface of printed circuit board 121, and the processing 115 and power supply 123 circuits are fixed and electrically connected to the upper surface of printed circuit board 123.

In the example of FIG. 1, the assembly 101 of ultrasound transducers and electronic power supply and control circuit 110 are monolithically integrated, for example in a same package (not shown in the drawing) to form a monolithic ultrasound imaging module.

In this example, the assembly 101 of ultrasound transducers is arranged above electronic power supply and control circuit 110. More specifically, in the shown example, printed circuit board 103 is arranged above the assembly comprising printed circuit board 121 and circuits 111 and 113, which is itself arranged above the assembly comprising printed circuit board 123 and circuits 115 and 117. In other words, printed circuit boards 123, 121, and 103 are vertically stacked. Mechanical fastening elements, not shown, may be provided to mechanically fasten the printed circuit boards to one another. Further, electric connection elements, not shown, may be provided to electrically couple the printed circuit boards to one another.

A protective dielectric material 131, for example a protective resin, may be arranged between printed circuit boards 123 and 121 and between printed circuit boards 121 and 103. As an example, material 131 totally fills the gaps between printed circuit board 123 and printed circuit board 121 and between printed circuit board 121 and printed circuit board 103. Protective material 131 may further cover the lower surface of printed circuit board 123, and the upper surface of printed circuit board 103 around the assembly 101 of ultrasound transducers.

The device 100 of FIG. 1 further comprises a coupling layer 140, for example made of a polymer material, for example electrically insulating, coating the upper surface of the assembly 101 of ultrasound transducers. As an example, layer 140 is arranged on top of and in contact with the upper surface of the assembly 101 of ultrasound transducers. As a variant, layer 140 is fixed to the upper surface of transducer assembly 101 via an adhesive layer, not shown.

In the shown example, layer 140 also covers the upper surface of printed circuit board 103 around the assembly 101 of ultrasound transducers. More specifically, in this example, layer 140 continuously extends over the entire surface of printed circuit board 103.

The thickness of coupling layer 140 is, for example, in the range from 100 µm to 5 mm, for example from 500 µm to 1 mm.

The upper surface of layer 140 defines a contact surface on which an object to be imaged can be placed, for example one or a plurality of fingers of a user, a user's palm, or any other part of the human or animal body which is desired to be imaged.

Layer 140 has a function of ultrasound coupling between the transducers of assembly 101 and the object to be imaged. In particular, layer 140 is preferably relatively flexible and deformable to avoid the presence of air gaps between the transducers of assembly 101 and the object to be imaged. Further, layer 140 preferably has an acoustic impedance adapted to that of the object to be imaged, for example an acoustic impedance substantially equal to the acoustic impedance of the skin. Thus, layer 140 enables to maximize the transfer of acoustic energy between the ultrasound transducers and the object to be analyzed.

Layer 140 may further have a function of protection of device and, in particular, of the ultrasound transducers of assembly 101. In particular, layer 140 preferably has a relatively high mechanical strength so as not to degrade over time and in contact with the objects to be imaged.

Experiments carried out by the inventors have shown that, for certain applications, for example for microvascular imaging applications, the quality of the acquired images strongly depends on the temperature of the imaged object. For example, the imaging of light blood flows and of microscopic vessels located at the tips of the fingers and of the toes is difficult to achieve, since these vessels are located at the coldest tips and may undergo a vasoconstriction and thus a blood flow decrease.

According to an aspect of a first embodiment, it is provided to integrate to the imaging device a heating device adapted to heating the object to be imaged during a phase of acquisition of an ultrasound image. This enables to increase the temperature of the object during the acquisition, and thus to increase the quality of the acquired images, particularly for microvascular imaging applications.

In the example of FIG. 1, heating device 150 is a heat sink configured to collect heat generated by the electronic control and power supply circuit 110, and to conduct it to the upper surface side of the device, above the assembly 101 of ultrasound transducers.

More particularly, in this example, heating device 150 comprises a first metal foil or layer 151 covering the upper surface of transmit circuit 111, a second metal foil or layer 153 covering the upper surface of receive circuit 113, a third metal foil or layer 155 covering the upper surface of processing circuit 115, and a fourth metal foil or layer 157 covering the upper surface of power supply circuit 117. Each of the metal foils 151, 153, 155, and 157 extends, for example, continuously over the entire surface of the underlying electronic circuit 111, respectively 113, respectively 115, respectively 117.

The heating device 150 of FIG. 1 further comprises a metal foil or layer 159 covering the upper surface of the assembly 101 of ultrasound transducers. Metal foil 159 for example continuously extends over the entire upper surface of the assembly 101 of ultrasound transducers. As an example, metal foil 159 is embedded in coupling layer 140, between the upper surface of the assembly 101 of ultrasound transducers and the upper surface of layer 140. In other words, metal foil 159 covers a lower portion of layer 140 and is covered by an upper portion of layer 140. As a variant, metal foil 159 is located on top of and in contact with the upper surface of the coupling layer.

The heating device 150 of FIG. 1 further comprises metal regions 160 thermally coupling metal foils 151, 153, 155, and 157 to the upper metal foil 159.

In the example of FIG. 1, heating device 150 further comprises four thermal switches 161, 163, 165, 167 respectively thermally coupling metal foils 151, respectively 153, respectively 155, respectively 157, to the upper metal foil 159. Each of switches 161, 163, 165, 167 is adapted to, in a first configuration, thermally connect metal foil 161, respectively 163, respectively 165, respectively 167, to upper metal foil 159, and, in a second configuration, thermally isolating metal foil 161, respectively 163, respectively 165, respectively 167, to upper metal foil 159.

Switches 161, 163, 165, and 167 are, for example, mechanical switches, such as metal bimetal switches, adapted to automatically switching from the first configuration to the second configuration when their temperature exceeds a first predefined threshold, and from the second configuration to the first configuration when their temperature falls below a second predefined threshold, equal to or lower than the first threshold (hysteresis). As a variant, switches 161, 163, 165, 167 are electrically controlled according to temperature measurements made by one or a plurality of temperature sensors of the device, not detailed in the drawing. As a variant, switches 161, 163, 165, and 167 may be omitted, heat-collecting metal foils 151, 153, 155, and 157 being, for example, directly thermally connected to the upper metal foil 159.

In operation, the heat generated by electronic control and power supply circuit 110 is collected by collection metal foils 151, 153, 155, and 157, and conducted to the upper surface of the device where it is dissipated by dissipation metal foil 159.

This enables to heat the object to be imaged during a phase of acquisition of an ultrasound image.

Switches 161, 163, 165, and 167 enable, if relevant, to stop all or part of the heat flow transmitted to the upper metal foil 159 if the heat generated by electronic control and power supply circuit 110 is too significant, in order to prevent risks of burns to the user and/or of damage to coupling layer 140 or the ultrasound transducers. In this case, the heat flow may be redirected towards an auxiliary heat sink, not shown, located, for example, on the lower surface side of the device.

An advantage of the device 100 of FIG. 1 is that heating device 150 collects the heat generated by electronic control and power supply circuit 110 to heat the object to be imaged and thus improve the quality of the acquired images. Another advantage is that the metal layers further ensure a function of shielding of the ultrasound transducers, protecting the latter from possible electromagnetic interference.

Figure 2:
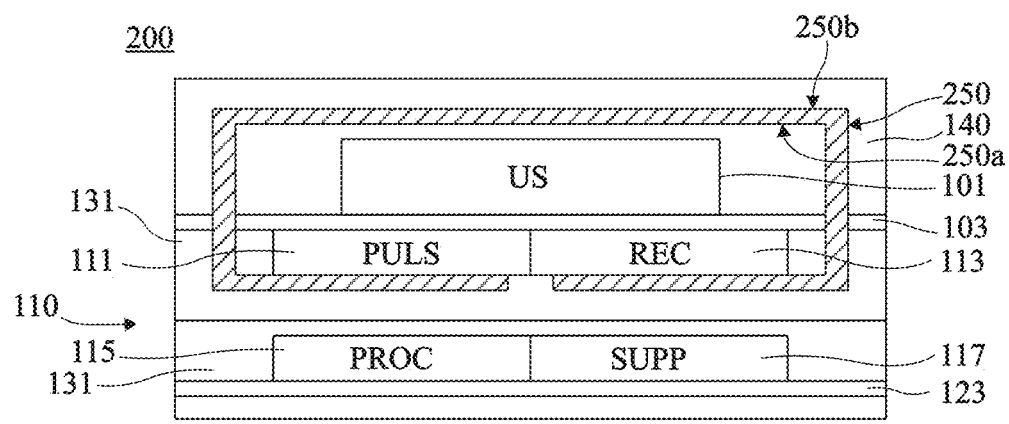
FIG. 2 schematically shows another example of an ultrasound imaging device according to an embodiment.

FIG. 2 is a cross-section view schematically showing another example of an ultrasound imaging device 200 according to an embodiment.

The device 200 of FIG. 2 differs from the device 100 of FIG. 1 essentially in that, in device 200, the heating device 150 of FIG. 1 is replaced with a heating device 250.

The heating device 250 of FIG. 2 is a flexible Peltier module. Peltier module 250 has the shape of a flexible band or web and has a first surface 250a, called cold surface, intended to be placed against a heat-generating device, and a second side 250b, called hot surface, intended to face a heat dissipation area.

In this example, the Peltier module covers the upper surface of the assembly 101 of ultrasound transducers, the edges of the Peltier module being folded under a portion of electronic control and power circuit 110.

More specifically, in the example of FIG. 2, the emitter 111 and receiver 113 circuits are fixed and electrically connected to the lower surface of printed circuit board 103, and the edges of the Peltier module are folded under the lower surface of circuits 111 and 113 and above circuits 115 and 117. In this example, printed circuit board 121 may be omitted.

As an example, the upper portion of the Peltier module, covering the assembly 101 of ultrasound transducers, is embedded in coupling layer 140, between the upper surface of the assembly 101 of ultrasound transducers and the upper surface of layer 140.

In this example, at the upper portion of Peltier module 250, the hot surface 250b of the Peltier module faces the upper surface of the imaging device, that is, towards the object to be imaged. At the folded edges of Peltier module 250, the cold surface 250a of the Peltier module is in contact with the lower surface of electronic circuits 111 and 113.

In operation, Peltier module 250 cools electronic circuits 111 and 113 and dissipates the heat generated on its hot surface side, in particular on the upper surface side of the imaging device having the object to be imaged placed thereon.

An advantage of the device 200 of FIG. 2 is that heating device 250 collects the heat generated by electronic control and power supply circuit 110 to heat the object to be imaged, and further enables to cool electronic control and power supply circuit 110.

Figure 3:
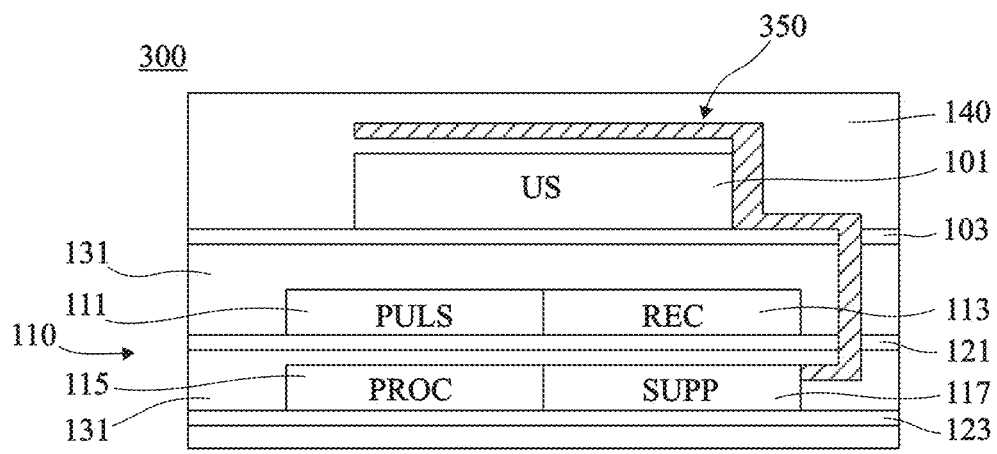
FIG. 3 schematically shows another example of an ultrasound imaging device according to an embodiment.

FIG. 3 is a cross-section view schematically showing another example of an ultrasound imaging device 300 according to an embodiment.

The device 300 of FIG. 3 differs from the device 100 of FIG. 1 essentially in that, in device 300, the heating device 150 of FIG. 1 is replaced with a heating device 350.

The heating device 350 of FIG. 3 is a resistive heating mat comprising a serpentine metal resistor, for example arranged between two sheets of electrically-insulating material, for example a polyimide.

Heating mat 350 covers for example the entire upper surface of the assembly 101 of ultrasound transducers. Heating mat 350 is, for example, connected to power supply circuit 117 for its electric power supply.

In the example of FIG. 3, heating mat 350 is embedded in coupling layer 140, between the upper surface of the assembly 101 of ultrasound transducers and the upper surface of layer 140.

An advantage of the device 350 of FIG. 3 is that heating device 350 can be precisely controlled to obtain the desired temperature at the upper surface of coupling layer 140.

Figure 4:
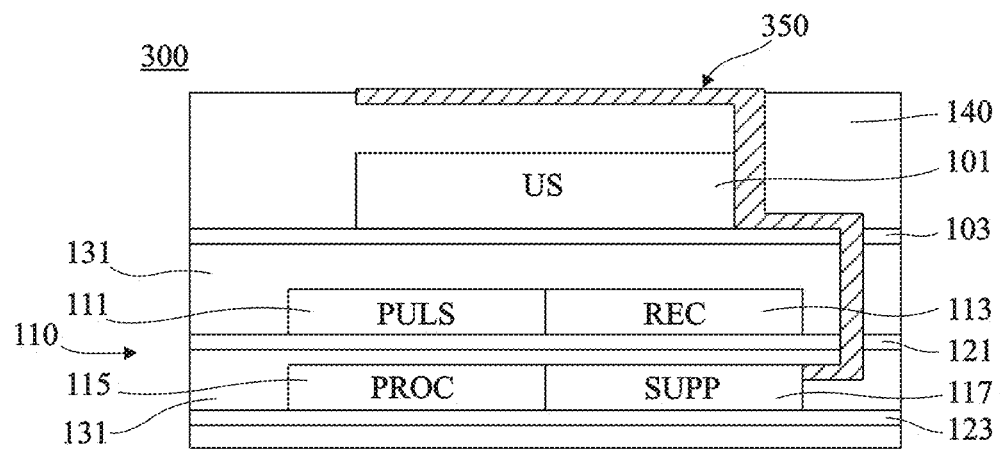
FIG. 4 schematically shows another example of an ultrasound imaging device according to an embodiment.

FIG. 4 is a cross-section view schematically showing an alternative embodiment of the ultrasound imaging device 300 of FIG. 3.

In this variant, heating mat 350 is flush with the upper surface of coupling layer 140. This variant is less favorable for the acquisition of skin prints, since the image plane to be acquired (the skin surface) is very close to the metal serpentines of the heating mat. As a result, the impression of the metal serpentines is superimposed on the image of the finger, which degrades the quality of the acquisition. This variant is however adapted for the acquisition of an image in a plane more distant from the contact surface of the device, for example a microvascular image, the heating mat then no longer being visible in the acquired image.

Figure 5:
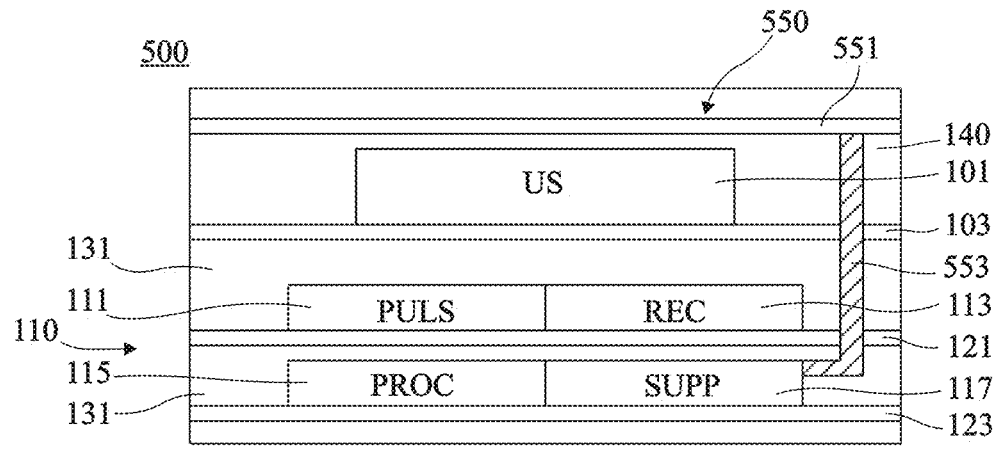
FIG. 5 schematically shows another example of an ultrasound imaging device according to an embodiment.

FIG. 5 is a cross-section view schematically showing another example of an ultrasound imaging device 500 according to an embodiment.

The device 500 of FIG. 5 differs from the device 100 of FIG. 1 essentially in that, in device 500, the heating device 150 of FIG. 1 is replaced with a heating device 550.

Heating device 550 comprises a heating layer 551 made of a thermoelectric polymer material, that is, a polymer material adapted to generating heat under the effect of an electric biasing.

Layer 551 is for example made of a material based on poly(3,4-ethylenedioxythiophene) (PEDOT), or of a polymer material to which conductive nanoparticles, such as silver nanowires, have been added, enabling to obtain a conductivity level generating a heating when subjected to electrical stress. As a variant, layer 551 is made of a transparent conductive oxide, such as indium tin oxide (ITO), fluorine-doped indium tin oxide (FTO), or aluminum-doped zinc oxide (AZO). As a variant, layer 551 is a material based on carbon nanotubes or on graphene.

In this example, heating layer 551 is integrated in coupling layer 140. More particularly, in this example, layer 551 covers a lower portion of coupling layer 140 and is covered by an upper portion of coupling layer 140.

In this example, the thickness of heating layer 551 is relatively thin as compared with the total thickness of coupling layer 140.

As an example, the thickness of heating layer 551 is in the range from 50 to 200 nm, for example in the order of 100 nm.

The heating device 550 of FIG. 5 further comprises electric connection elements 553 electrically coupling heating layer 551 to the electronic power supply circuit 117 of the device.

Figure 6:
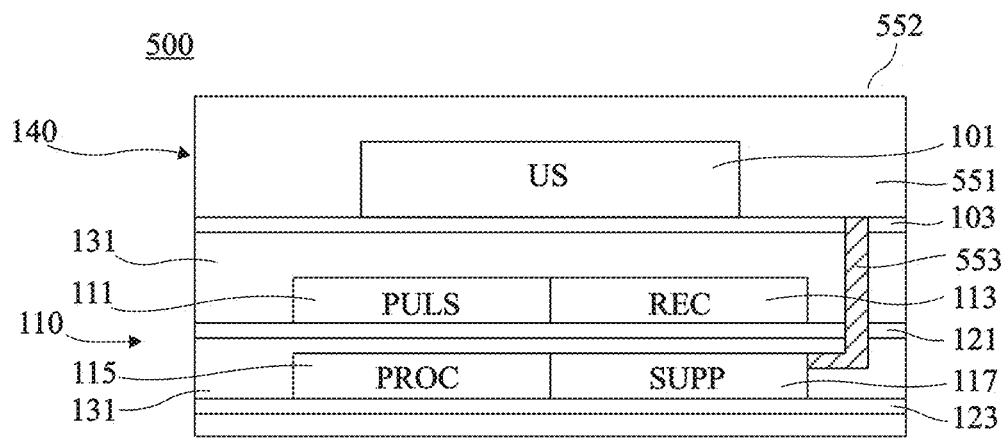
FIG. 6 schematically shows another example of an ultrasound imaging device according to an embodiment.

FIG. 6 is a cross-section view schematically showing an alternative embodiment of the ultrasound imaging device 500 of FIG. 5.

In this variant, heating layer 551 has a relatively large thickness, and forms the most part of the thickness of coupling layer 140. Coupling layer 140 may further comprise a relatively thin electrically-insulating layer 552 covering layer 551, to prevent any risk of electrocution to the user.

More generally, the heating devices 150, 250, 350, and 550 of the imaging devices described in relation with FIGS. 1, 2, 3, 4, 5, and 6 may be replaced with any other heating device adapted to heating the object to be imaged during a phase of acquisition of an ultrasound image of the object, for example an infrared LED-based device.

According to an aspect of a second embodiment, the coupling layer 140 of the imaging device is made of a polymer material having mechanical properties and in particular a Young's modulus that can be modified under the effect of a stimulus, for example a thermal (heating or cooling), luminous, electrical, chemical (water, pH, etc.) or mechanical (pressure or impact) stimulus. Coupling layer 140 is configured to have a first Young's modulus during a phase of acquisition of an ultrasound image, and a second Young's modulus greater than the first Young's modulus outside of said acquisition phase. In other words, it is provided to control the mechanical properties of coupling layer 140 to improve the acoustic coupling properties of layer 140 during the acquisition. More specifically, it is provided to make coupling layer 140 more conformable, for example softer or more flexible during the acquisition, so as to improve the acoustic coupling between the transducers and the object to be analyzed, and less conformable, for example, harder or more rigid outside of the acquisition, to reinforce the mechanical protection properties provided by layer 140. As an example, the Young's modulus of coupling layer 140 during the acquisition of an ultrasound image is at least 10% lower, preferably at least 20% lower, and more preferably at least 50% lower, than outside of the acquisition, for example when the imaging device is switched off. As an example, the Young's modulus of coupling layer 140 is smaller than 1.7 MPa and preferably smaller than 0.7 MPa during the acquisition, and greater than 2.5 MPa and preferably greater than 5.5 MPa outside of the acquisition.

According to a first example of embodiment, coupling layer 140 is made of a thermoactive polymer material, that is, a polymer material having its mechanical properties, and in particular its Young's modulus, modified under the effect of heat.

In this case, the coupling device may comprise a heating device adapted to heating coupling layer 140 to a temperature higher than the ambient temperature, for example to a temperature higher than 25° C., preferably higher than 30° C., preferably higher than 35° C., preferably higher than 40° C., during a phase of acquisition of an ultrasound image, to decrease the Young's modulus of layer 140. Outside of acquisition phases, the heating device may be interrupted to bring coupling layer 140 back to the ambient temperature, and thus increasing its Young's modulus.

The heating device may be identical or similar to the devices previously described in relation with FIGS. 1 to 6. In other words, the first embodiment (heating of the object to be imaged during the acquisition) and the first example of the second embodiment (modification of the mechanical properties of the coupling layer by heating during the acquisition) may be combined.

As a variant, the heat used to decrease the Young's modulus of the coupling layer during the acquisition is only the heat emitted by the object to be imaged itself, for example, a user's finger, when the latter is placed on the upper surface of the coupling layer. In this case, the imaging device may comprise no specific heating device.

As an example, coupling layer 140 is made of a thermoactive polymer based on PTFE (polytetrafluoroethylene), PLA (polylactide), EVA (ethylene-vinyl acetate), PCL (poly (ε-caprolactone), tBA/PEGDMA (tert-butyl acrylate/poly (ethylene glycol) dimethacrylate), PU (polyurethane), PMMA (poly(methyl methacrylate), polystyrene (PS), or silicone.

As a variant, a similar operation can be achieved with a polymer having its mechanical properties modified under the effect of a cooling. In this case, the heating device may be replaced with a cooling device.

Figure 7:
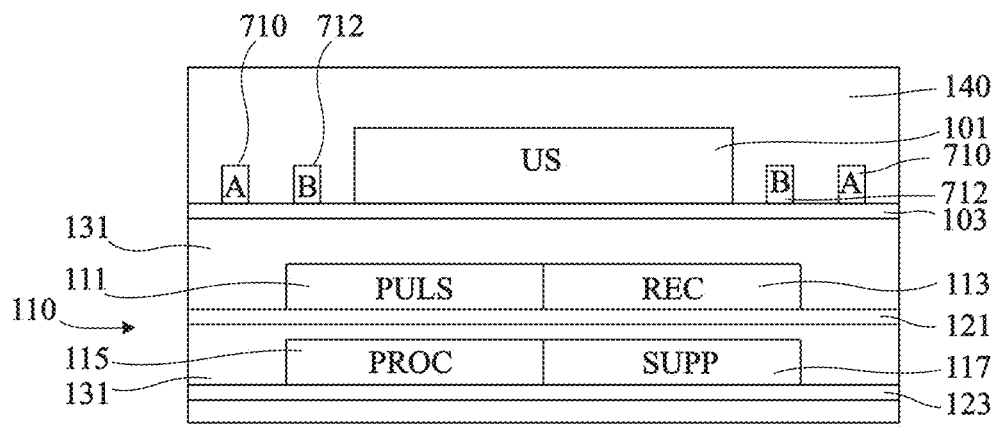
FIG. 7 schematically shows another example of an ultrasound imaging device according to an embodiment.

FIG. 7 is a cross-section view schematically showing a second example of an ultrasound imaging device 700 according to the second embodiment.

In this example, coupling layer 140 is made of a photoactive polymer material, that is, a polymer material having its mechanical properties and in particular its Young's modulus modified under the effect of a light radiation.

The device 700 of FIG. 7 substantially comprises the same elements as the device 100 of FIG. 1, except for heating device 150.

In this example, coupling layer 140 is made of a photoactive polymer having its Young's modulus taking a first, relatively low value under the effect of a light irradiation at a first wavelength A, and recovers a second, relatively high value under the effect of a light irradiation at a second wavelength B, different from A.

Wavelengths A and B are, for example, visible or infrared wavelengths. However, the described embodiments are not limited to this specific case.

Device 700 comprises one or a plurality of light sources 710 adapted to emitting a radiation at wavelength A through coupling layer 140, and one or a plurality of light sources 712 adapted to emitting a radiation at wavelength B through coupling layer 140. Light sources 710 and 712 are, for example, fixed and connected to printed circuit board 103, at the periphery of the assembly 101 of ultrasound transducers. Light sources 710 and 712 are, for example, light-emitting diodes (LEDs) adapted to respectively emitting at wavelength A and at wavelength B.

Electronic control and power supply circuit 110 is configured to, before a phase of acquisition of an ultrasound image, for example when an object to be imaged is detected in front of the assembly 101 of ultrasound transducers, activate light source(s) 710 to make coupling layer 140 relatively soft and improve its acoustic coupling properties, and then, after the acquisition, activate light source(s) 712 to make the coupling layer 140 relatively hard and improve its mechanical protection properties.

For example, when the user places a finger on the upper surface of layer 140 for the capture of a fingerprint, circuit 110 activates the emission at wavelength A, which enables to release the stress and enables layer 140 to adapt to the morphology of the finger. At the end of the capture, the polymer recovers its smooth shape (in other words, the upper surface of layer 140 becomes substantially flat again) and the emission is activated at wavelength B, which enables to stiffen the polymer to keep layer 140 in this state.

Advantageously, the example of embodiment of FIG. 7 can be adapted to a photoacoustic imaging device, that is, a device in which, during the acquisition of an ultrasound image, modulated light is emitted towards the object to be imaged. In this case, the same light source can be used to emit the modulated light during the acquisition and to soften the coupling polymer of layer 140 (wavelength A).

As a variant, the return to the initial state (relatively high Young's modulus) may be simply achieved by interruption of the irradiation at wavelength A, by heating or cooling, or under the effect of another stimulus. In this case, the light sources emitting at wavelength B may be omitted.

As an example, coupling layer 140 is made of a photoactive polymer comprising diazo-type groups, acrylate derivatives, cinnamic derivatives, furanic derivatives, or other groups known for their photosensitive properties. Those skilled in the art will be capable of selecting the appropriate group according to its chemical compatibility with the coupling polymer of layer 140 and to the desired photoactivation properties.

Figure 8:
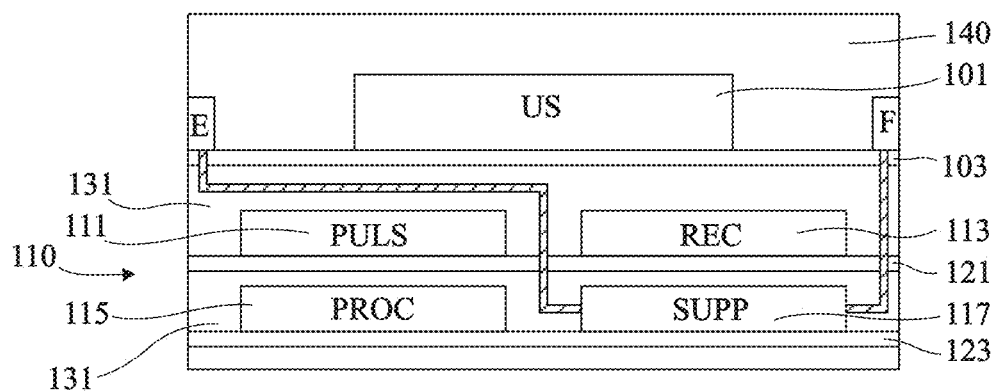
FIG. 8 schematically shows another example of an ultrasound imaging device according to an embodiment.

FIG. 8 is a cross-section view schematically showing a third example of an ultrasound imaging device 800 according to the second embodiment.

In this example, coupling layer 140 is made of an electroactive polymer material, that is, a polymer material having its mechanical properties and in particular its Young's modulus modified under the effect of an electric biasing, for example under the effect of an electric voltage.

The device 800 of FIG. 8 substantially comprises the same elements as the device 100 of FIG. 1, except for heating device 150.

In this example, coupling layer 140 is made of an electroactive polymer having its Young's modulus taking a first, relatively low value under the effect of an electric biasing, for example an electric voltage, applied between electrodes E and F in contact with the polymer, and a second, relatively high value in the absence of said electric biasing.

Electrodes E and F are for example in contact with the polymer of coupling layer 140 respectively in the vicinity of two opposite lateral edges of layer 140.

Electrodes E and F, for example, are coupled to the electronic power supply circuit 117 of the device for the application of the electric biasing.

Electronic control and power supply circuit 110 is configured to, before a phase of acquisition of an ultrasound image, for example when an object to be imaged is detected in front of the assembly 101 of ultrasound transducers, apply the electric biasing to make coupling layer 140 relatively soft and improve its acoustic coupling properties, and then, after the acquisition, deactivate the electric biasing to make coupling layer 140 relatively hard and improve its mechanical protection properties.

For example, when the user places a finger on the upper surface of layer 140 to capture a fingerprint, circuit 110 activates the electric biasing of layer 140, which enables to release the stress and enables layer 140 to adapt to the morphology of the finger. At the end of the capture, the polymer recovers its smooth shape (in other words, the upper surface of layer 140 becomes substantially flat again) and the electric biasing is deactivated, which enables to stiffen the polymer to maintain layer 140 in this state.

As an example, coupling layer 140 is made of an electroactive polymer from the family of polyacrylates, polyurethanes, latexes, natural rubbers, silicones, butadiene-acrylonitrile copolymers, piezoelectric polymers of PVDF (polyvinylidene fluoride) type, or its copolymer P (VDF-TrFE) (vinylidene fluoride and trifluoroethylene).

There have been described hereabove, in relation with the second embodiment, examples of use where coupling layer 140 is configured to have a first Young's modulus during a phase of acquisition of an ultrasound image, and a second Young's modulus greater than the first Young's modulus outside of said acquisition phase, for example, when the device is switched off. According to the targeted applications, two successive acquisition phases may be provided, during which the coupling layer is configured to have different Young's moduli. As an example, a first acquisition phase is implemented by configuring coupling layer 140 to have a relatively high Young's modulus, and then a second acquisition phase is implemented by configuring coupling layer 140 to have a relatively low Young's modulus. During the first acquisition phase, the coupling layer is relatively hard. One may then, for example, acquire a surface fingerprint image, for example, by impedography. During the second acquisition phase, the coupling layer is relatively soft (conformable). One may then for example acquire a depth image of the member to be imaged, for example, a microvascular image, for example, by Doppler imaging. The device thus enables to implement a bimodal acquisition, with a same coupling material and within a very short time interval.

Various embodiments and variants have been described. Those skilled in the art will understand that certain features of these various embodiments and variants may be combined, and other variants will occur to those skilled in the art. In particular, the described embodiments are not limited to the examples of materials and of dimensions mentioned in the present disclosure.

Further, those skilled in the art will be capable of combining the various embodiments described hereabove according to the needs of the targeted application. In particular, those skilled in the art will be capable of combining the first and second embodiments described hereabove to benefit from both the advantage linked to the heating of the object to be imaged during the acquisition and the adaptation of the mechanical properties of the coupling layer under the effect of a stimulus. In particular, the examples of embodiment of FIGS. 7 and 8 may be combined with the examples of embodiment of FIG. 1, 2, 3, 4, 5, or 6.

Further, although only examples of application to ultrasound imaging devices have been described hereabove, those skilled in the art will know, based on the indications of the present description, how to adapt the described embodiments to other ultrasound emission and/or reception devices, for example devices for treating the human or animal body by ultrasound emission, or also non-destructive ultrasound testing devices not necessarily applied to the human or animal body.

Finally, the practical implementation of the described embodiments and variants is within the abilities of those skilled in the art based on the functional indications given hereabove.

The invention claimed is:

1. Ultrasound imaging device comprising
an assembly of ultrasound transducers, and
an acoustic coupling layer coating said assembly of ultrasound transducers, a surface of the acoustic coupling layer opposite to said assembly of ultrasound transducers defining a contact surface with an object or a body to be imaged, wherein the acoustic coupling layer is made of a polymer material activatable by means of an electronic circuit for powering and controlling the device, configured to have a first Young's modulus during a phase of acquisition of an ultrasound image and a second Young's modulus when the device is switched off, wherein:
   a) the acoustic coupling layer is made of a thermoactive polymer, the imaging device further comprising a heating device configured to heat the acoustic coupling layer during a phase of acquisition of an ultrasound image, and to interrupt the heating outside of said acquisition phase; or
   b) the acoustic coupling layer is made of a photoactive material, the imaging device further comprising a light source configured to irradiate the acoustic coupling layer during a phase of acquisition of an ultrasound image, and to be interrupted outside of said acquisition phase: or
   c) the acoustic coupling layer is made of an electroactive material, the electronic circuit for powering and controlling the device being configured to apply an electric biasing to the acoustic coupling layer during a phase of acquisition of an ultrasound image, and to interrupt said electric biasing outside of said acquisition phase.

2. Device according to claim 1, wherein the acoustic coupling layer is made of a thermoactive polymer that can be activated to have the first Young's modulus when its temperature exceeds a threshold in the range from 25° C. to 40° C.

3. Device according to claim 1, wherein the acoustic coupling layer is made of a photoactive material having its Young's modulus taking the first value under the effect of a light irradiation at a first wavelength A, and recovering the second value under the effect of a light irradiation at a second wavelength B, different from A, or when the irradiation at the first wavelength A is interrupted, or under the effect of another stimulus.

4. Device according to claim 3, wherein the light sources is adapted to emitting a radiation at wavelength A through the acoustic coupling layer, the device further comprising one or a plurality of other light sources adapted to emitting a radiation at wavelength B through the acoustic coupling layer.

5. Device according to claim 4, wherein said light source and said other light sources are controlled by the electronic power supply and control circuit.

6. Device according to claim 1, wherein the acoustic coupling layer is made of an electroactive material having its Young's modulus taking the first value under the effect of an electric biasing and recovering the second value in the absence of said electric biasing.

7. Device according to claim 6, comprising first and second electrodes in contact with the acoustic coupling layer and connected to the electric power supply and control circuit for the application of said electric biasing.

8. Device according to claim 1, wherein the ultrasound transducers of the assembly of ultrasound transducers are CMUT or PMUT transducers, piezoelectric, or piezocomposite transducers, or single-crystal transducers.

9. Ultrasound imaging device comprising
an assembly of ultrasound transducers, and
an acoustic coupling layer coating said assembly of ultrasound transducers, a surface of the acoustic coupling layer opposite to said assembly of ultrasound transducers defining a contact surface with an object or a body to be imaged, wherein the acoustic coupling layer is made of a polymer material activatable by means of an electronic circuit for powering and controlling the device, configured to have a first Young's modulus during a phase of acquisition of an ultrasound image and a second Young's modulus when the device is switched off, wherein:
   a) the acoustic coupling layer is made of a thermoactive polymer, the imaging device further comprising a heating device configured to heat the acoustic coupling layer during a phase of acquisition of an ultrasound image, and to interrupt the heating outside of said acquisition phase; or
   b) the acoustic coupling layer is made of a photoactive material the imaging device further comprising a light source configured to irradiate the acoustic coupling layer during a phase of acquisition of an ultrasound image, and to be interrupted outside of said acquisition phase; or
   c) the acoustic coupling layer is made of an electroactive material, the electronic circuit for powering and controlling the device being configured to apply an electric biasing to the acoustic coupling layer during a phase of acquisition of an ultrasound image, and to interrupt said electric biasing outside of said acquisition phase, said electric biasing being applied be applied via first and second electrodes in contact with the acoustic coupling layer respectively in the vicinity of two opposite lateral edges of the acoustic coupling layer.

* * * * *